United States Patent [19]
Roux

[11] 3,877,825
[45] Apr. 15, 1975

[54] TUBULAR CONSTRUCTION ELEMENTS ASSEMBLED BY INTERLOCKING PARTS

[76] Inventor: Marcel Henri Rene Roux, Saint Martin de Brethencourt, 78660 Ablis Yvelines, France

[22] Filed: Mar. 9, 1973

[21] Appl. No.: 339,520

[30] Foreign Application Priority Data
Apr. 27, 1972 France .............................. 72.14995

[52] U.S. Cl. ................. 403/233; 52/665; 52/758 A; 52/758 C
[51] Int. Cl. ......................... E04c 2/42; E04f 15/06
[58] Field of Search .. 52/665, 758 R, 758 A, 758 C; 403/223, 234; 211/182, 148, 177; 182/228

[56] References Cited
UNITED STATES PATENTS

| | | | |
|---|---|---|---|
| 1,031,660 | 7/1912 | Olsen | 52/758 C |
| 1,092,655 | 4/1914 | Louden | 52/758 C |
| 2,562,483 | 7/1951 | Bender | 52/758 R |
| 2,897,013 | 7/1959 | Delp | 52/758 R |
| 3,273,921 | 9/1966 | Young et al. | 52/758 R |

FOREIGN PATENTS OR APPLICATIONS

| | | | |
|---|---|---|---|
| 24,353 | 12/1894 | United Kingdom | 403/234 |
| 1,153,661 | 10/1957 | France | 52/758 R |
| 583,828 | 11/1924 | France | 403/234 |

*Primary Examiner*—Henry C. Sutherland
*Attorney, Agent, or Firm*—Raymond A. Robic; Arthur Schwartz

[57] ABSTRACT

A construction assembly comprises a metallic tube provided at least at one of its ends with a pair of hooked fork-like gripper arms capable of receiving a further tubular element and of locking it by means of a keying member inserted by force between the free ends of the arms and against the hooks and pressing it against the side of the further tubular element. The present invention is particularly applicable to the construction of triangular tubular frameworks, such as towers, girders, scaffoldings, etc.

7 Claims, 6 Drawing Figures

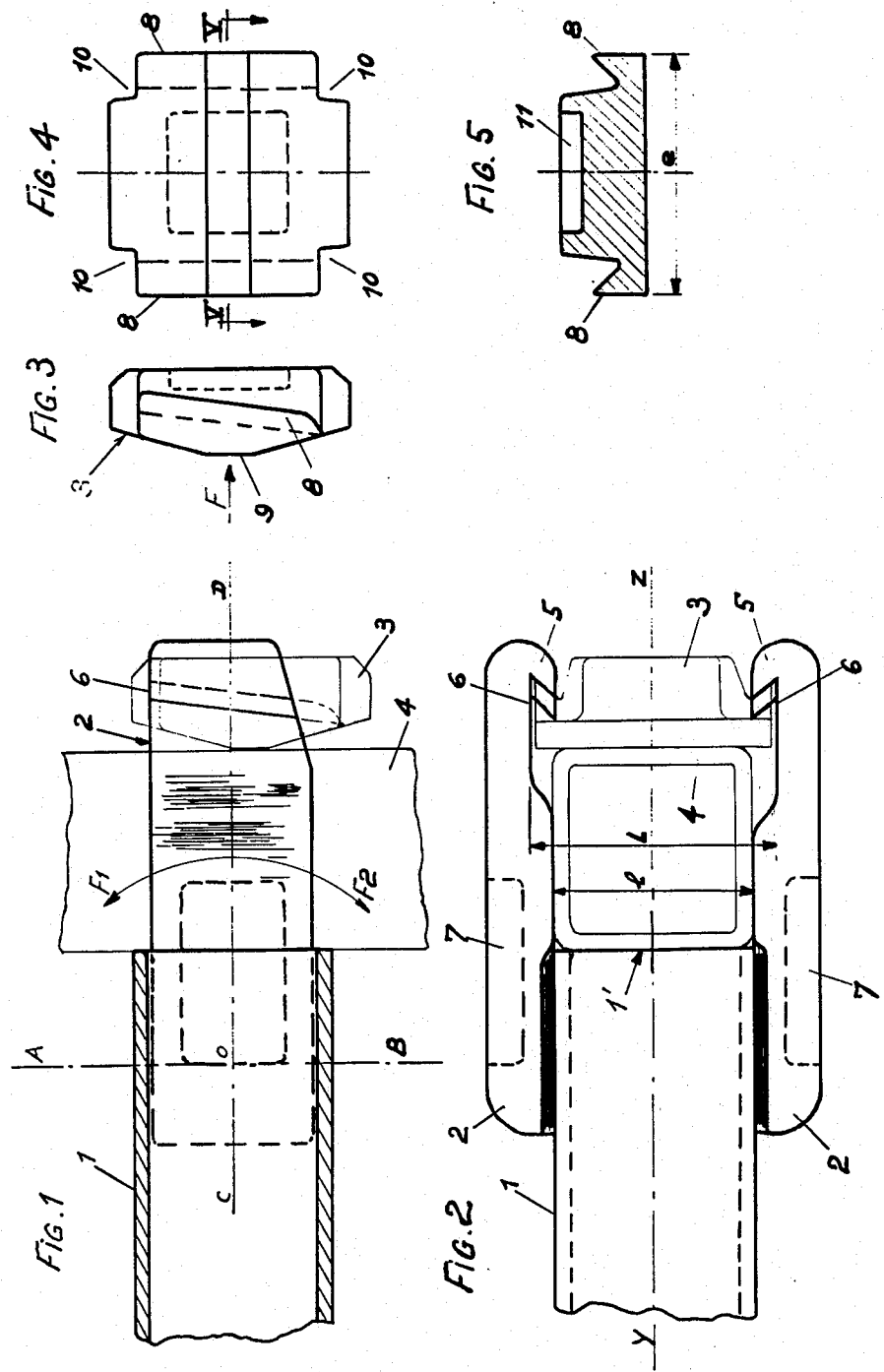

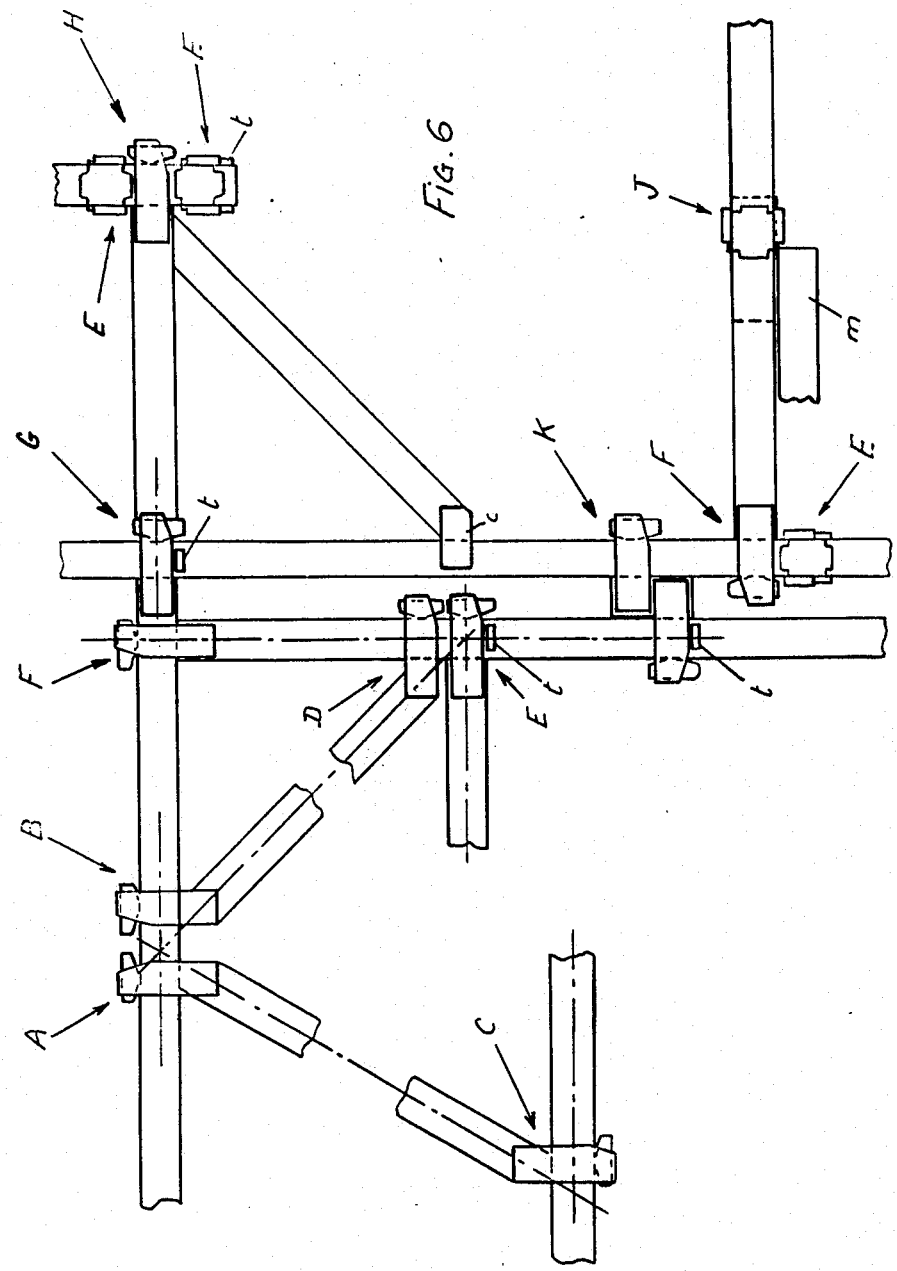

TUBULAR CONSTRUCTION ELEMENTS ASSEMBLED BY INTERLOCKING PARTS

The present invention relates to tubular construction elements assembled by keying interlock and, more specifically, it relates to tubular elements provided with key-action assembling and fastening members, these elements being designed to provide the framework, the cross-members, the wind-braces and to ensure triangulation of tubular constructions, such mainly as towers, girders, support and service scaffoldings and any constructions in which such triangular assemblies may be incorporated, including shelves and cantilever supports. According to the invention, these elements are therefore designed to allow the erection of any tubular construction having a temporary or permanent, fixed or moveable character, so as to be rapidly assembled and disassembled, displaced, carried and easily stored away and so as not to require any conventional tightening and locking threaded member, any specialized equipment, except a striking tool such as a conventional hammer.

Tubular elements known up to date for the erection of such constructions are assembled by various means, as for example by nesting, coupling, flange, yoke, stirrup, etc . . . calling in most cases for fixing members such as bolts, screws, pins, spindles and the like. These known elements, however, are generally very heavy, hard to handle, to assemble and to set up and also their manipulation requires at least two persons, as well as skilled labor for their assembling and disassembling.

On the other hand, most of these construction elements of the prior art use assembling members fixed in a cantilever fashion which give rise to twisting and/or bending effects and which do not allow the forces to be directed towards the effective transmission points thereof, so much so that the constructions may tend to become distorted and thus somewhat unsafe whereby their use becomes awkward. In short, these known elements nearly always require a thorough study to obtain a reliable and resistant construction, complying with safety standards, and they must be frequently checked.

Therefore, it is an object of the present invention to overcome the aforementioned drawbacks and to provide tubular construction assemblies which are simple, light in weight, resistant, compact, easily displaceable and storable, designed for fast and easy assembly and/or disassembly, not requiring any skilled labor nor an important number of assemblers, nor a frequent and expensive maintenance and, thus, having a very advantageous cost.

Also, according to the invention, the tubular assemblies are provided with fast assembling and fixing members disposed so that the forces transmitted by these elements always fall onto effective triangulation points without causing torsional and/or bending stresses, therefore rendering kinking, buckling or twisting of the resulting constructions highly unlikely.

Besides, the tubular assemblies according to the invention, are designed to be self-sufficient that is, in any constructions that may be conceived and made with them, they do not require any other foreign elements, with the exception of supporting uprights if these are needed in the projected construction.

According to the invention, a tubular construction assembly made by interlocking parts is constituted by a tube of desired length, according to the contemplated use, provided at least at one of its ends with two fork-like gripper arms facing each other, each of which including at its free end an internal grip or keying hook and the space between which is adapted to receive and firmly confine a tube pressed against the end of the tubular element following the insertion by force of a wedging key member against the hooks, which member is adapted to cooperate therewith and provide a compression on the confined tube, the said compression increasing gradually as the key member is forceably inserted.

More specifically and according to the invention, each keying hook is constituted by an internal recess located near the free end of an arm inwardly thereof, which recess is shaped in the form of a female half-dovetail designed so as to have a slight slope with respect to the vertical from the outside towards the inside in the plane of the gripper arm. The keying member cooperating with the keying hook is formed with its parallel lateral edges notched in the form of a male half-dovetail and designed so as to be force fitted into the female half-dovetails of the hooks. The male half-dovetails of the keying member have a slope, with respect to the vertical, substantially corresponding to that of the hooks. The face of the keying member intended to bear firmly against the surface of the tube confined between the gripper arms, has the shape of a roof having two slopes and a flat bearing part at its crest.

According to another feature of the invention, the two gripper arms which face each other are oriented, according to the contemplated use, in an angular direction selected with respect to the longitudinal axis of the tubular element and perpendicularly to the longitudinal axis of the tube to be confined.

On the other hand, according to a particular embodiment of the invention, the keying member may be fixed to the end of a tubular element by its face which is opposite the roof shaped face, so as to provide a cantilever element with respect to an assembly, the so fixed keying member being the keying member of the assembly of a gripper arm tubular element on another tubular element, lies in the extension of the gripper arms thereof.

The tubular element, according to the invention, may besides constitute a stiffening spacer element between two parallel tubular elements spaced from each other by one tube, said spacer element being made up of a piece of tube of sufficient length to carry, on each of two of its opposite sides, two grippers arms disposed side by side and each having their free ends oriented in opposite directions, the two gripper arms being nevertheless perpendicular to the spacer element. Finally, the tubular element according to the invention may be designed in the form of a wind-brace element between two tubular elements angularly fixed in two different parallel planes, said wind-brace element being made up of a tube which carries at one end a pair of gripper arms angularly oriented so to be perpendicularly engaged onto one of the tubular elements and, at the other end, a fast brace part which is high enough to make-up for the distance between the two planes and which itself carries a pair of gripper arms angularly oriented so to be perpendicularly engaged onto the other wind-braced tubular element.

It should be noted that, preferably, the tubular element is of square cross-section, the gripper arms being adapted to grasp an element of the same cross-section which can further comprise stop brackets to support the base of the gripper arms when, according to the position of the arms, the key member must be inserted from the top down. In another assembly where the gripper arms will be disposed in an upside down position from the preceding position, the keying member will be able to bear against one of the brackets with its insertion side pointing upwardly, the gripper arms of the tubular element to be secured being engaged by the forced motion of the element.

Other features of the invention will be emphasized by the following discription of non limitive embodiments of the tubular construction elements illustrated in the accompanying drawings in which:

FIG. 1 is a cross-sectional view of one end of a tubular construction element, taken along line Y-Z of FIG. 2;

FIG. 2 is a plan view of the said end;

FIG. 3 is a side elevation view of the keying member of the tubular construction element which forms an integral part of the invention and cooperates with this element for its fastening onto another element;

FIG. 4 is a front elevation view of the key member, as seen along arrow F of FIG. 3;

FIG. 5 is a cross-sectional view of the keying member, along line V—V of FIG. 4; and FIG. 6 is a side view of an assembly showing adaptations of the tubular construction elements.

As shown more particularly by heavier lines in FIG. 1 and 2, the tubular element which is the object of the invention is constituted by a tube 1 of the desired length, provided at least at one of its ends with two gripper arms 2 welded or otherwise secured thereon and facing each other in the manner of a fork, each of which including at its free end an internal keying hook 5, the spacing L between the hooks being such as to receive and confine firmly a tube 4 (lighter lines) under compression against the end 1' of the tubular element 1 following the force fitting of a keying member 3 (in lighter lines and shown in detail in FIGS. 3, 4 and 5) into the hooks 5, the said member being adapted to cooperate therewith and to provide compression on the confined tube 4, the compression increasing as the force fitted insertion of the member progresses.

More specifically, the hook 5 of each arm 2 comprises an internal recess 6 in the form of a female half-dovetail designed to be mated with a male half-dovetail 8 of the key member 3 and to cooperate with it. The female half-dovetail of each hook is designed so as to have a slight slope with respect to the vertical, as seen in the drawings the slope extending from the outside towards the inside in the plane of the gripper arm, as best shown in FIG. 1.

As is very explicitly illustrated in FIGS. 3 to 5, the keying member 3 cooperating with hooks 5 of the arms 2 is a part which, seen in plan, is substantially quadrilateral, of which lateral edges, cut-out as at 10, are parallel and grooved so as to define two male half-dovetails 8 adapted to engage in the female half-dovetails of the hooks 5. The male half-dovetails 8 have, as best shown by FIG. 3, a slope with respect to the vertical which substantially corresponds to that of hooks 5. Moreover, the face of this member 3 which is to bear firmly against the corresponding side of tube 4 confined between the arms 2 has the shape of a roof having two slopes and a flat bearing surface at its crest.

It should also be noted that the width $e$ (FIG. 5) of the member 3 is slightly smaller than the width L (FIG. 2) between the recesses 6, so as not to spread the arms but rather to allow these to be slightly brought together when the key member is force fitted in.

As shown in FIGS. 1 to 5, in order to lighten the parts, the gripper arms have external recesses 7 and the keying member 3 has an external recess 11 which can be provided on its bottom with a sign indicating the direction of keying insertion.

As more easily seen in FIG. 6, illustrating as examples various possible assemblies obtained with the tubular construction elements according to the invention, the gripping arms 2 facing each other may be oriented, taking into account their contemplated use, according to a selected angular orientation with respect to the longitudinal axis of the tubular element. These various orientations are in fact shown by the arrows F1 and F2, in FIG. 1, with respect to the longitudinal axis C-D and may take up a perpendicular position at point O along line A-B. In fact, the orientation of the gripping arms 2 is selected so as to be always perpendicular to the confined tube and so that the forces transmitted by these assembled tubular elements fall substantially on a common point, as is easily apparent from FIG. 6.

In this FIG. 6, the various typical assemblies of the tubular element are schematically illustrated. In assemblies A, B, C and D, the gripping arms are angularly oriented and the tubular elements to which they are secured may therefore define wind-braces or triangulation elements. In the right-angle assemblies E and E, the arms are in line with the tubular element, as shown in detail in FIG. 1 and 2 and may, in the setting-up of the elements, eventually bear against brackets $t$ provided for that purpose on the tube to be confined, before the introduction of the keying member. It should furthermore be noted that, according to the position of the arms, the keying member can be introduced either from the bottom or from the top. However, the position of the gripping arms that allows the insertion of the keying member from the bottom up ensures, in the absence of brackets, a more reliable assembly considering that the very weight of the assembled tubular element, as well as the loads that it carries, contribute to the wedging force applied to the keying member.

Also, as shown in assembly G of FIG. 6, according to a particular embodiment, the keying member may be secured onto a tubular end of the element by its face which is opposite the roof-shaped face, so as to provide a shelf-like cantilever tubular element of which the diagonal brace bears against the confined tube through a yoke $c$; this shelf may furthermore comprise, at its end opposite the keying member, a pair of gripper arms whereby to make an assembly H, which assembly may or may not be framed by transverse assemblies of the type shown at E.

The tubular element, according to the invention, may also be designed as as to provide a spreading and stiffening spacer between two tubes, as shown in assembly K of FIG. 6. This spacer comprises, as illustrated, two pairs of gripping arms mounted in parallel but having their hooks extending in opposite directions. This tubular element may also, according to the invention, be designed so as to form a wind-brace $m$ (shown at the bottom right of FIG. 6) between two tubular elements angularly fixed, as at F and E, in two different parallel planes, the said wind-brace element comprising a tube which is provided at one end, on the assembly side E, with a pair of gripping arms perpendicularly oriented with respect to the tubular element secured by assembly E and, at the other end, with a spacer part (shown in dotted lines) carrying a pair of gripper arms perpendicularly oriented with respect to the tubular element secured by assembly F, providing assembly J.

It is to be understood that these different embodiments of the tubular element, as shown in FIG. 6, are not limitative but are merely illustrative of the principles of the invention.

Finally, the tubular element of the invention is shown in all figures as being of square cross-section, but it is to be understood that, without departing from the scope of the invention, it may be of rectangular, hexagonal, octagonal or even circular cross-section.

I claim:

1. A joint construction for joining first and second tubular members each having opposed parallel planar side faces comprising:

a pair of gripping arms rigidly fixed to and projecting from said opposed sides at one end of said first tubular member, said arms facing each other in spaced parallel relation; the free ends of said arms being turned inwardly toward one another and being formed to define keying hooks;

said spaced arms receiving the second tubular member therebetween with one of its planar faces abutting the end of said first tubular member, between said arms;

a keying member having opposed lateral edges thereof with keying surfaces formed thereon and mating with the keying hooks of said arms and so formed that movement thereof in one direction parallel to said second tubular member causes said keying member to engage the other side face of said second tubular member and to clamp said second tubular member against the said end of said first tubular member;

each keying hook being defined by a recess located near the free end of a gripping arm, inwardly thereof, said recess being in the form of a female half-dovetail; the female half-dovetail of each keying hook being configured to have a slight slope with respect to the second tubular member whereby to wedge said keying member against said second tubular member; the keying member cooperating with the hooks is an element having parallel lateral edges notched in the form of a male half-dovetail slidably fitted into the female half-dovetails of the hooks; the male half-dovetails of the keying member having a slope corresponding to the slope of the hooks; the face of said keying member which bears against the surface of said second tubular member having chamfered end portions and a flat intermediate portion making surface contact with said other side face of said second tubular member.

2. A tubular joint as defined in claim 1, wherein the two arms are inclined, in an angular direction with respect to the longitudinal axis of the first tubular member and are perpendicular to the longitudinal axis of said second tubular member.

3. A tubular joint as defined in claim 2, wherein said keying member is secured to the end of a third tubular member extending from that face of said keying member which is opposite said second tubular member whereby said third tubular member forms a cantilever element extending from said joint.

4. A tubular joint as defined in claim 2, wherein opposite ends of said first tubular member have said arms thereon, extending in respectively opposite lateral directions with spaced parallel second tubular members therebetween, said first tubular member serving as a stiffening spacer between said second tubular members.

5. A tubular joint as defined in claim 2, comprising a wind-brace assembly between two tubular members angularly fixed in two different parallel planes, said wind-brace assembly being made up of said first tubular member with said gripping arms angularly oriented and perpendicularly engaged on one of said two tubular members and, at the other end having a spacer part of a height to span the distance between said two planes and which carries a pair of said gripping arms angularly oriented so as to be perpendicularly engaged on the other of said wind-brace assembly.

6. A tubular joint as defined in claim 5, wherein said first and second tubular members are of square cross-section with said second tubular member extending generally vertical, said gripping arms being oriented to support said keying member for downward clamping movement; and stop brackets on said second tubular member positioned to support said gripping arms.

7. A tubular joint as defined in claim 5, wherein said first and second tubular members are of square cross section with said second tubular member extending generally vertical, said gripping arms being oriented to support said keying member for upward clamping movement, and brackets on said second tubular member positioned to abut the upper edges of said gripping arms.

* * * * *